(12) United States Patent
Hsiao et al.

(10) Patent No.: US 10,275,113 B2
(45) Date of Patent: Apr. 30, 2019

(54) 3D VISUALIZATION

(71) Applicant: HEWLETT-PACKARD DEVELOPMENT COMPANY, L.P., Houston, TX (US)

(72) Inventors: Chih Pin Hsiao, Palo Alto, CA (US); Gregory William Cook, Palo Alto, CA (US); Jishang Wei, Palo Alto, CA (US); Mithra Vankipuram, Palo Alto, CA (US); Nelson L Chang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 31 days.

(21) Appl. No.: 15/511,747

(22) PCT Filed: Dec. 19, 2014

(86) PCT No.: PCT/US2014/071575
§ 371 (c)(1),
(2) Date: Mar. 16, 2017

(87) PCT Pub. No.: WO2016/099556
PCT Pub. Date: Jun. 23, 2016

(65) Prior Publication Data
US 2018/0335925 A1 Nov. 22, 2018

(51) Int. Cl.
*G06F 3/01* (2006.01)
*G06F 3/0481* (2013.01)
(Continued)

(52) U.S. Cl.
CPC .......... *G06F 3/04815* (2013.01); *G06F 3/011* (2013.01); *G06F 3/012* (2013.01);
(Continued)

(58) Field of Classification Search
CPC .............................. G06F 3/012; H04N 13/122
(Continued)

(56) References Cited

U.S. PATENT DOCUMENTS 8,581,901 B2 11/2013 Joshi
2009/0167679 A1 7/2009 Klier et al.
(Continued)

FOREIGN PATENT DOCUMENTS

CN 104205034 A 12/2004
TW 201419042 A 5/2014
(Continued)

OTHER PUBLICATIONS

Cohen, P., McGee, D., Oviatt, S., Wu, L., Clow, J., King, R., Rosenblum, L. (1999), Multimodel interaction for 2D and 3D environments. IEEE Computer Graphics and Applications, 19(4), 10-13.
(Continued)

*Primary Examiner* — Abdul-Samad A Adediran
(74) *Attorney, Agent, or Firm* — HPI Patent Department

(57) ABSTRACT

An example system is provided in according with one implementation of the present disclosure. The system includes a 3D display displaying at least one three-dimensional (3D) visualization, an auxiliary computing device including a multi-touch display and a plurality of sensors, and a behavior analysis engine to perform a behavior analysis of a user by using data from the plurality of sensors. The behavior analysis engine is to: determine an attention engagement level of the user, and determine a pose of the user in relation to the auxiliary computing device. The system further includes an intention analysis engine to determine an intention of the user in relation to the at least one 3D visualization based on the user's attention engagement level and the user's pose, and an interaction mode
(Continued)

engine to automatically adjust the system to an interaction mode based on the identified user intention.

13 Claims, 10 Drawing Sheets

(51) Int. Cl.
  *G06F 3/03* (2006.01)
  *G06F 3/0488* (2013.01)
(52) U.S. Cl.
  CPC .............. *G06F 3/013* (2013.01); *G06F 3/017* (2013.01); *G06F 3/0304* (2013.01); *G06F 3/04883* (2013.01); *G06F 2203/011* (2013.01); *G06F 2203/04808* (2013.01)
(58) Field of Classification Search
  USPC ............................................ 345/156; 348/53
  See application file for complete search history.

(56) References Cited

U.S. PATENT DOCUMENTS

| | | |
|---|---|---|
| 2009/0303231 A1 | 12/2009 | Robinet et al. |
| 2011/0041098 A1 | 2/2011 | Kajiya et al. |
| 2012/0066648 A1 | 3/2012 | Rolleston et al. |
| 2012/0249590 A1 | 10/2012 | Maciocci et al. |
| 2013/0154913 A1* | 6/2013 | Genc ................... G06F 3/012 345/156 |
| 2013/0294648 A1 | 11/2013 | Rhoads et al. |
| 2014/0104206 A1 | 4/2014 | Anderson |
| 2014/0129990 A1 | 5/2014 | Xin et al. |
| 2014/0139639 A1 | 5/2014 | Wagner et al. |
| 2014/0145936 A1 | 5/2014 | Gu et al. |
| 2014/0365333 A1 | 12/2014 | Hurewitz |
| 2016/0014403 A1* | 1/2016 | Stroetmann .......... H04N 13/122 348/53 |

FOREIGN PATENT DOCUMENTS

| | | |
|---|---|---|
| TW | 201445029 A | 12/2014 |
| WO | 2011-071929 A2 | 6/2011 |
| WO | WO-2014106219 A1 | 7/2014 |

OTHER PUBLICATIONS

Jansen, Y., & Dragicevic, P.(2013). An interaction model for visualizations beyond the desktop, IEEE Transactions on Visualization and Computer Graphics, 19(12), 2396-405. doi:10.1109/TVCG.2013.134.

Keefe, D. F., & Isenberg, T. (2013). Reimagining the Scientifc Visualization Interaction Paradigm. Computer, 46(5), 51-57. doi:10.1109/MC.2013.178.

Masaki Ito, Yuu Furuichi, Jin Nakazawa and Hideyuki Tokada, Mpath View: An Interactive Behavior History Viewer for Enhancing Communication; May 18, 2005, http:/www.pervasive.ifi.lmu.de/adjunct-proceedings/demo/p093-096.pdf.

Petri Tanskanen et al; "Live Metric 3D Reconstruction on Mobile Phones"; Oct. 24, 2013, https://cvg.ethz.ch/mobile/LiveMetric3DReconstructionICCV2013.pdf.

Shaer, O., Mazalek, A., Ullmer, B., & Konkel, M. (2013), From Big Data to Insights: Opportunities and Challenges for TEI in Genomics. In Proceedings of the 7th International Conference on Tangible, Embedded and Embodied Interaction, (pp. 109-116), New York, USA.

* cited by examiner

3D VISUALIZATION

BACKGROUND

Interactive devices and systems continue to play an important role today. Some of these devices and systems may display three-dimensional ("3D") virtual objects (also called 3D visualizations). Organizations and individuals regularly use different types of interactive devices and systems in various areas and for different applications.

DETAILED DESCRIPTION OF SPECIFIC EXAMPLES

Figure 1:
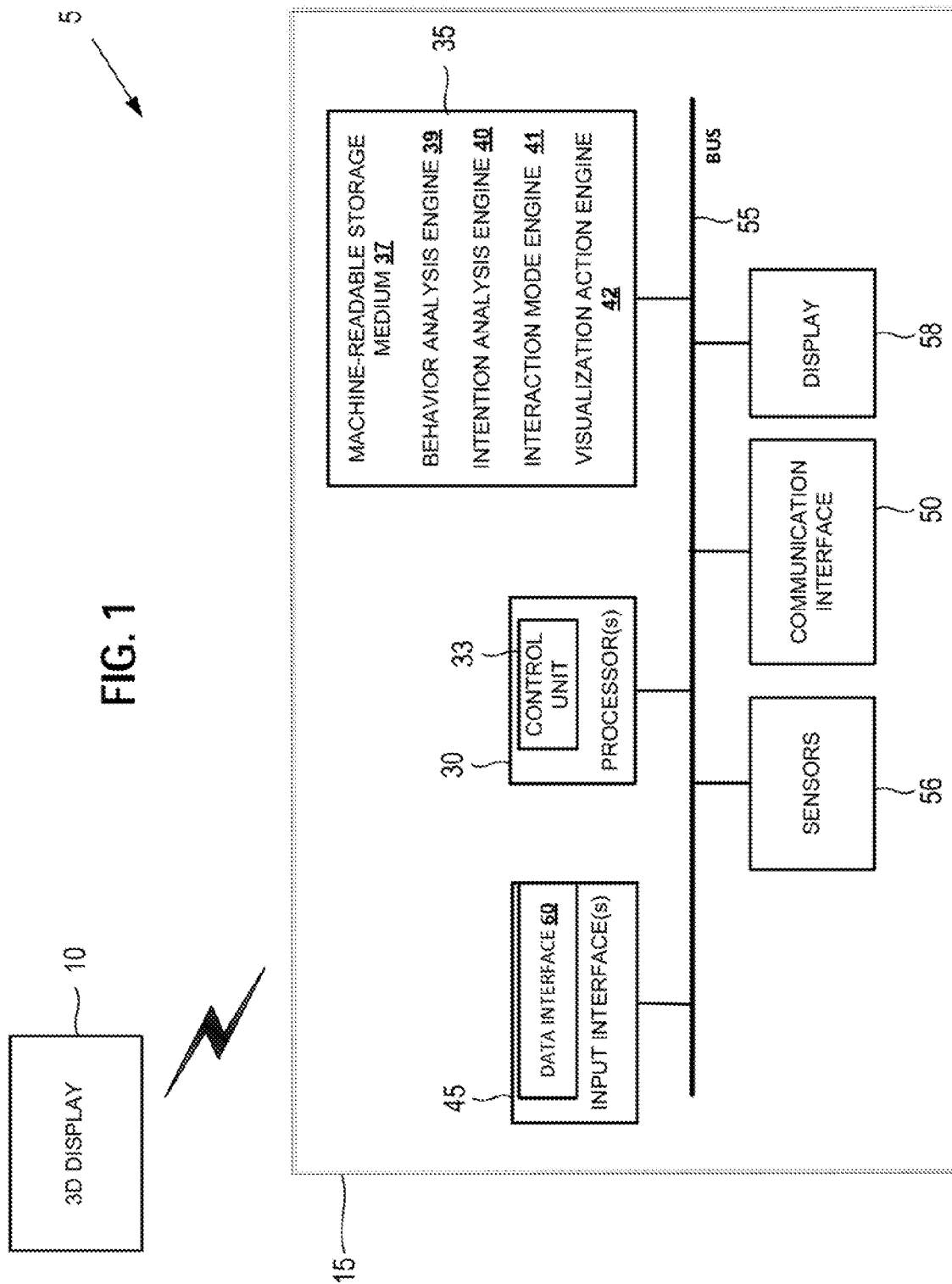
FIG. 1 is a schematic illustration of an example interactive system in accordance with an implementation of the present disclosure.

As noted above, with the recent improvements in technology, interactive devices and systems (i.e., devices and systems that may display visual objects and allow for user interaction) are becoming increasingly popular in all industries. Interactive devices and systems come in different sizes, forms, and may include different technical features. Different users rely on different type of interactive devices or systems for many day-to-day activities and work related tasks. As used herein, the term "user" refers to any type of individual, organization, group, business, or any other party that may need to operate or communicate with an interactive device or a system.

Due to the proliferation of venous electronic devices, the technological capabilities of interactive systems are continuously changing and increasing. Some of these devices and systems may be capable of displaying 3D visualizations (also called virtual objects). As used herein, the terms "3D visualization" and "virtual object" are to be used interchangeably and refer to any type of 3D image or 3D formation that may be displayed and viewed. In some examples, these 3D visualizations may include different types of data represented in an interactive form. As a result, these interactive devices and systems may be widely used by organization, businesses, or individual users.

One problem with the available 3D interaction devices and systems is that they may not offer accurate and efficient ways for users to communicate or interact with the 3D visualizations. In some situations, the existing systems and techniques for operating these systems and connecting with the 3D virtual objects are too complex and cumbersome. For example, the interactive systems may use conventional input sources (e.g., mouse, keyboard, etc.) that are difficult to operate when interacting with 3D virtual objects. Further, existing systems cannot automatically adapt to the user's behavior and may take a long time to switch between different interaction modes. As used herein, the term "interaction mode" refers to different methods for operating or manipulating 3D objects in an interaction system, including but not limited to: navigation, selection, pointing, filtering, zooming, storing, quantitative measurement, querying, historical path, annotations, etc. For example, an interaction mode may define the commands that an interaction system should expect and execute in relation to interacting with 3D objects displayed by the system.

Due to the encumbrances described above, the learning curve of operating such systems and interacting with 3D objects may be significantly extended and that makes these systems less desirable for users. In addition, using buttons or other switches to change interaction modes takes time, effort, and slows down the operation of a system. Therefore, improved 3D systems and techniques for interacting with 3D visualizations are desired. These systems may adapt to user's behavior and intent and may provide more transparent and intuitive ways for navigating in 3D spaces and manipulating 3D objects in these virtual spaces. This will increase the effectiveness, efficiency and user satisfaction with such interactive systems.

The present description is directed to an improved solution that automatically adapts to the user's behavior and, therefore, allow for better and more efficient interaction with 3D visualizations. In one example, a system may include a 3D display displaying 3D virtual objects, a computing, device (e.g., a tablet) having a touch panel (e.g., a multi-touch display), and a plurality of sensors connected to the computing device. As used herein, the term "computing device" refers to any one of various personal computers, printers, smartphones, wearable electronic devices, display screens, tablets, personal data assistants (PDAs), laptops, servers, and other similar electronic devices that includes a processor, a display, and a plurality of sensors.

In one example, a processor of a system may: determine an attention engagement level of a user of the system, determine a pose of the user in relation to the computing device (i.e., how the user's hands hold the computing device), and determine an intention of the user in relation to the 3D virtual objects based on the user's attention engagement level and the user's pose. The processor may then transition the system to an interaction mode based on the identified user intention. In addition, the processor may execute an action (e.g., selection, data measurement, etc.) with at least one 3D virtual object based on an identified user gesture and a selected interaction mode.

Thus, the combination of elements in the proposed system may allow the system to evaluate the user's intentions (i.e., future behavior), to navigate to an appropriate interaction mode based on the intentions, and to execute desired actions to manipulate a 3D visualization. Instead of needing to use buttons to switch between different interaction modes, the system may adapt to the user's behavior and may switch its interaction mode according to the current use context.

A 3D display in combination with the motion of the computing device, the multi-touch panel, the plurality of sensors, and the user's hand gestures create a seamless environment between digital and virtual world and enable natural interactions. The proposed system enables intuitive ways to interact with 3D visualizations. Physical 3D interaction space is directly mapped to a stereoscopic 3D virtual world.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description ad should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Referring now to the figures, FIG. 1 is a schematic illustration of an example interactive system 5. The illustrated system 5 is capable of carrying out the techniques described below. As shown in FIG. 1, the system 5 is depicted as including a 3D display 10 (e.g., a stereoscopic display) and an auxiliary computing device 15.

The 3D display 10 may display at least one 3D visualization (not shown) that can include any type of 3D object (e.g., data, text, media, etc.). In one example, the 3D object may be shown on physical surface or screen (not shown) of the 3D display 10. In another example, the 3D object may appear floating in 3D space defined around (e.g., in front, in back, on top, on side, etc.) the 3D display 10 (not shown).

In one implementation, the computing device 15 may be a portable computing device (e.g., a tablet, a laptop, a smartphone, a personal digital assistant (PDA), etc.). In some examples, the system 5 may involve multiple users where each user "brings" a separate computing device for simultaneous or separate interaction with the 3D display 10.

The computing device 15 may include at least one processor 30, a memory 35, a plurality of engines 39-42, an input interface(s) 45, a communication interface 50, a plurality of sensors 56, and a multi-touch display panel 58. In another implementation, the computing device 15 may be a personal computer, an all in one computing device, a gaming console, a server, a visual player, an electronic notepad, a plurality of distributed computing devices, or any other suitable computing device that includes a processor, a plurality of sensors and a multi-touch display. In the implementation where the computing device 15 is not a portable device, a plurality of sensors (e.g., inertial sensors) may be attached to the hands of the user of the system 5.

In other examples, the computing device 15 may include additional components and some of the components depicted therein may be removed and/or modified without departing from a scope of the system that allows for carrying out the functionality described herein. It is to be understood that the operations described as being performed by the processor 30 of the computing device 15 that are related to this description may, in some implementations, be performed by a processor in the 3D display 10, an external processor (not shown), or distributed between the computing device 15 and other electronic/computing devices (not shown).

As explained in additional details below, the computing device 15 may include software, hardware, or a suitable combination thereof configured to enable functionality of the computing device 15 and to allow it to carry out the techniques described below and to interact with the one or more systems or devices. The computing device 15 may include communication interfaces (e.g., a Wi-Fi® interface, a Bluetooth® interface, a 3G interface, a 4G interface, a near field communication (NFC) interface, etc.) that are used to connect with other devices/systems and/or to a network (not shown). The network may include any suitable type or configuration of network to allow for communication between the computing device 15, the 3D display 10, and any other devices/systems (e.g., other computing devices, displays, etc.).

The processor 30 of the computing device 15 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory 35, the engines 39-42, the input interfaces 45, the communication interface 50, the plurality of sensors 56, and the multi-touch display panel 58 may be operatively coupled to a bus 55. The processor 30 may be suitable to retrieve and execute instructions stored in machine-readable storage medium 37. Processor 30 can include single or multiple cores on a chip, multiple cores across multiple chips, multiple cores across multiple devices, or combinations thereof. The processor 30 may include at least one controller 33 and may be implemented using any suitable type of processing system where at least one processor executes computer-readable instructions stored in the memory 35.

The communication interface 50 may allow the computing device 15 to communicate with plurality of networks, communication links, and external devices. The input interfaces 45 may receive information from devices/systems in communication with the computing device 15. In one example, the input interfaces 45 include at least a data interface 60 that may receive data from any external device or system.

The memory 35 may include any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored. The memory 35 may also be used for storing temporary variables or other intermediate information during execution of instructions to by the processor 30.

The computing device 15 may include various engines 39-42. Each of the engines 39-42 may include, for example, at least one hardware device including electronic circuitry for implementing the functionality described below, such as control logic and/or memory. In addition or as an alternative, the engines 39-42 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code, e.g., computer executable instructions, hardware, firmware, and/or logic, or combination thereof to perform particular actions, tasks, and functions described in more detail herein in reference to FIGS. 2-15.

The behavior analysis engine 39 may perform a behavior analysis of a user by using data from the plurality of sensors 56. For instance, the behavior analysis engine 39 may receive data from the sensors 56 and process the data to evaluate the behavior of the user. In one example, the behavior analysis engine 39 may determine an attention engagement level of the user (i.e., how engaged is the user with the elements of the system 5) and a pose of the user in relation to the auxiliary computing device 15 (i.e., how the users hands hold the device 15). As explained in additional details below, the results from the behavior analysis engine 39 may be used to determine the interaction mode of the system 5 (i.e., what command should the system be expecting and what actions should be executing at the moment).

In one example, the intention analysis engine 40 may determine an intention of the user in relation to at least one 3D visualization based on the user's attention engagement level and the user's pose. For instance, according to the user's behavior detected by the behavior analysis engine 39, the system may determine what are the intentions of the user in relation to a 3D object (e.g., user is about to explore an object, select an object, measure distance, etc.). The interaction mode engine 41 may automatically adjust the system 5 to an interaction mode based on the identified user intention. For example, the system 5 may adapt (e.g., adjust a viewpoint, settings, etc.) to the predicted behavior of the user.

The visualization action engine 42 may implement an action (e.g., selection, navigation, etc.) with the at least one 3D visualization based on a selected interaction mode and a detected user gesture. In one example, the system may recognize user inputs provided through gestures, and may perform a specific action based on the gesture and the previously selected interaction mode.

The plurality of sensors 56 may include different types of sensors that define a gestural interaction space (not shown) around the computing device 15. In one example, the sensors may include at least one optical depth sensor (e.g., stereo correlator, structured light, time-of-flight, etc.) positioned on the computing device 15 for scanning or collecting information from an environment around the device 15. The optical depth sensors may assist with recognizing the position of the computing device and identifying of various hand gestures of a user. In some implementations (e.g., when the device 15 is too thin and can't accommodate sensors), the system 5 may include a removable jacket (not shown) attachable to the computing device 15 to include the optical depth sensors. The removable jacket may have any form or size that fits the computing device 15.

In addition, the system 5 may include at least one passive optical sensor (e.g., a camera, etc.) positioned on the computing device 15 for scanning or collecting information from an environment around the device 15. The passive optical sensor may provide visual feedback of a user (e.g., eyes, head detection, etc.). The system 5 may also include a plurality of inertial sensors (e.g., accelerometers, gyroscopic sensors, magnetometers, etc.) positioned on the computing device 15 that may recognize movement and position of the computing device and hand position of the user (e.g., by the orientation/angle of the device 15).

The display panel 58 may be an LCD (Liquid Crystal Display), OLED (organic light emitting display) or another type of display. In one example, the display 58 may be a multi-touch display that can be controlled by the user through simple or multi-touch gestures. The display 58 may include any suitable touch-sensitive display technology that may be used for detecting touches on the touch-sensitive display. In some implementations, the display 58 may include at least one of a prismatic film (e.g., for glasses free operation) and a polarizing film (for use with passive optical glasses) attached to a top surface of the computing device 15 and covering the multi-touch display. In some examples, the film may be added to a jacket for the computing device 15. Having a prismatic film or a polarizing film on the display 58 may allow a user to view 3D visualizations on the Computing device 15 and to move these 3D visualizations to the 3D display 10.

Figure 2:
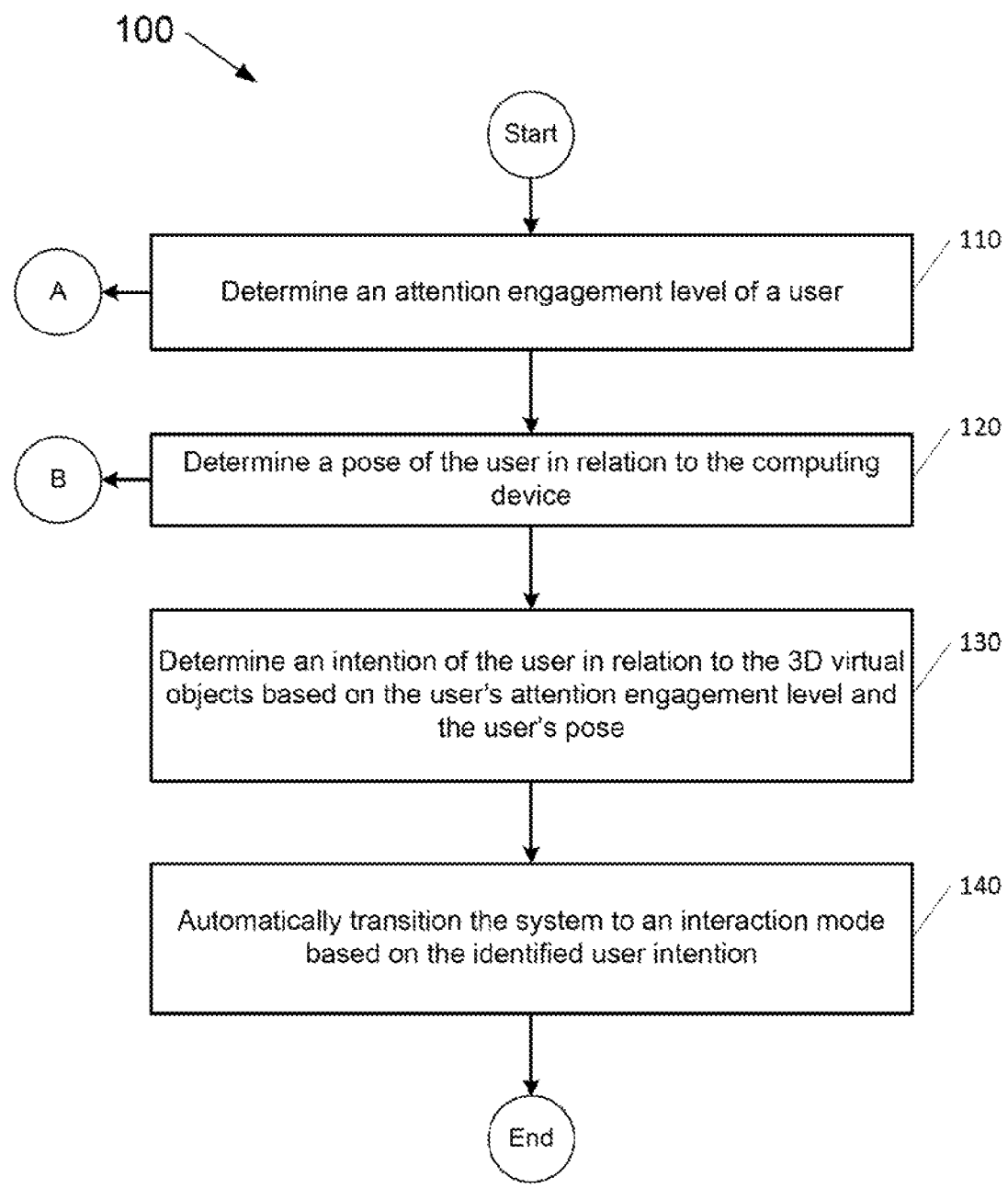
FIG. 2 illustrates a flow chart showing an example of a method for operating an interactive system in accordance with an implementation of the present disclosure.

FIG. 2 illustrates a flow chart showing an example of a method 100 for operating an interactive system. Although execution of the method 100 is described below with reference to the system 5, the components for executing the method 100 may be spread among multiple devices. The method 100 may be implemented in the form of executable instructions stored on a machine-readable storage medium, such as storage medium 37, and/or in the form of electronic circuitry.

In one example, the method 100 can be executed by the processor 30 of the computing device 15. In other examples, the method may be executed by a processor on the 3D display 10, or another processor in communication with the system 5. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 begins at 110, where the processor 30 may determine an attention engagement level of a user of the system 5. In one example, the attention engagement level may be a real number that indicates the engagement of the user in relation to the elements of the system 5.

Figure 3:
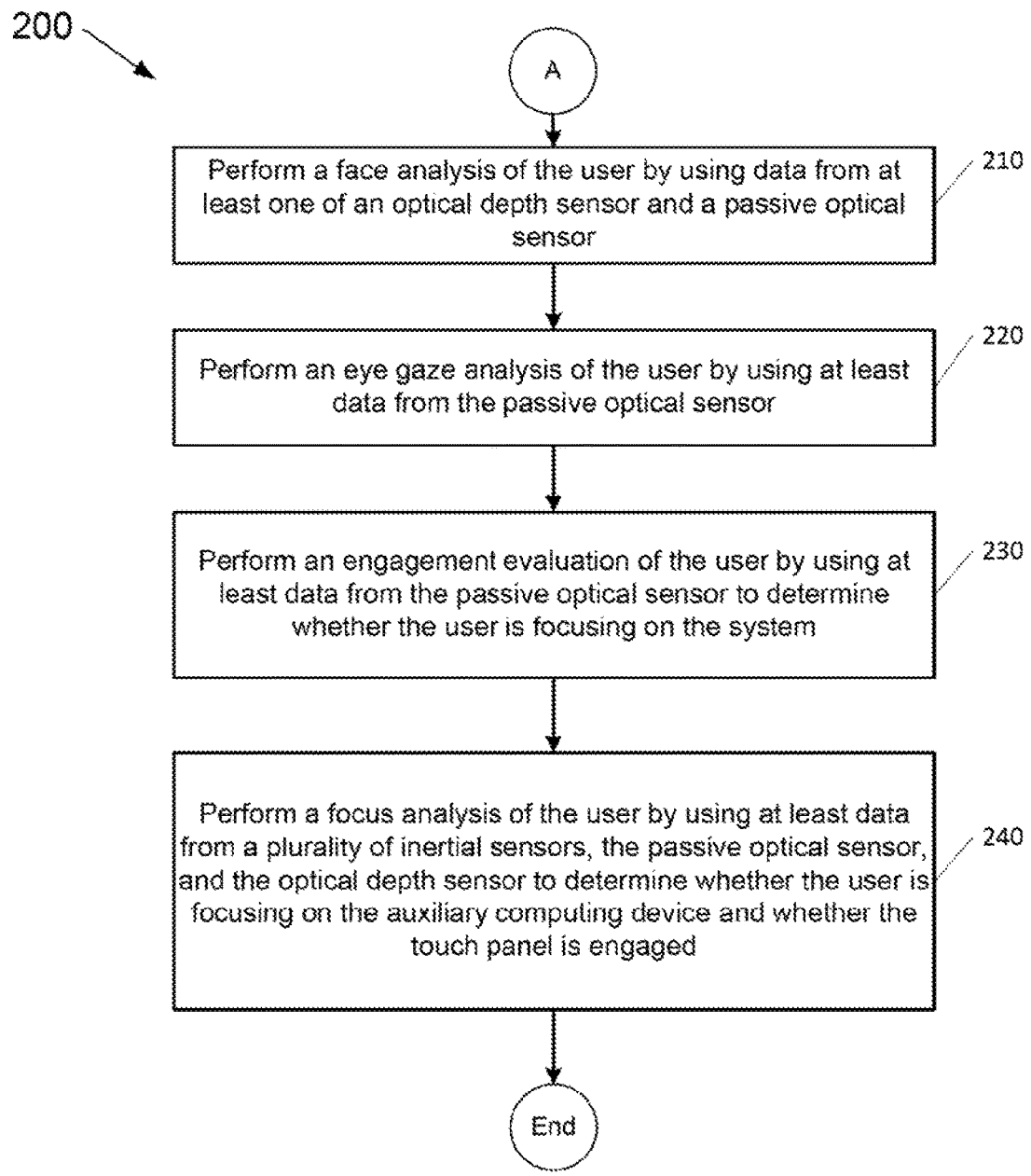
FIG. 3 illustrates a flow chart showing an example of a method for determining an attention engagement level of a user in accordance with an example implementation of the present disclosure.

FIG. 3 illustrates a flow chart showing an example of a method 200 for determining an attention engagement level of a user. In one example, the method 200 can be executed by the processor 30 of the computing device 15. Alternatively, the components for executing the method 200 may be spread among multiple devices.

The method 200 begins at 210, where the processor 30 may perform a face analysis of the user by using data from at least one of an optical depth sensor and a passive optical sensor. For example, based on the received data the processor may identify the position, orientation, etc. of the user's face. At 220, the processor may perform an eye gaze analysis of the user by using at least data from the passive optical sensor. For example, based on the received data the processor may identify the position, orientation, etc. of the users eyes. Thus, the system may use the data from an optical depth sensor and/or a passive optical sensor to analyze the users' face and eye gaze so that the system 5 knows how the user is looking at the elements of the system.

Next, the processor 30 may perform an engagement evaluation of the user by using at least data from the passive optical sensor to determine whether the user is focusing on the system 5 (at 230). The data from this and other sensors may be analyzed to confirm that the user is engaged with the elements of the system 5 (i.e., the 3D display, the computing device, the 3D objects, etc.). At 240, the processor 30 performs a focus analysis of the user by using at least data from a plurality of inertial sensors, the passive optical sensor, and the optical depth sensor to determine whether the user is focusing on the auxiliary computing device and whether the touch panel/display is engaged (e.g., by analyzing an input from the display). For example, the system 5 analyzes the data from these sensors to determine whether the user is looking at the computing device 15 and whether the device 15 is not being widely waived about (i.e., which may indicate that a user may not be focused on the device).

With continued reference to FIG. 2, the processor 30 may determine a pose of the user in relation to the computing device (at 120). In one example, the pose of the user may indicate how the user's hands hold the computing device 15 of the system 5.

Figure 4:
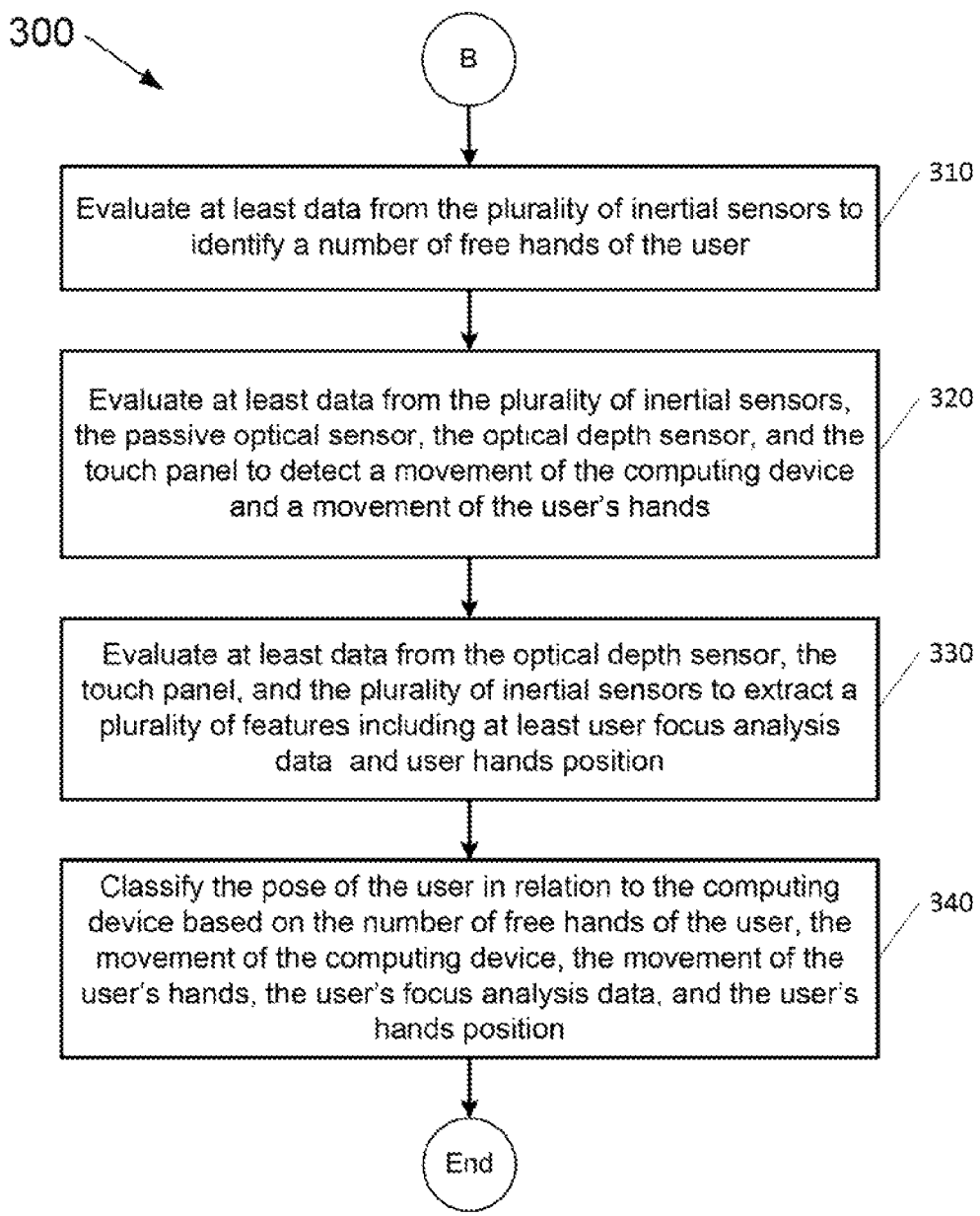
FIG. 4 illustrates a flow chart showing an example of a method for determining a pose of a user in relation to a computing device in accordance with an example implementation of the present disclosure.

FIG. 4 illustrates a flow chart showing an example of a method 300 for determining a pose of the user in relation to the computing device 15. In one example, the method 300 can be executed by the processor 30 of the computing device 15. Alternatively, the components for executing the method 200 may be spread among multiple devices.

The method 300 begins at 310, where the processor may evaluate at least data from the plurality of inertial sensors to identify a number of free hands of the user. For example, the processor may analyze the received data ire relation to a stability threshold to identify the number of user hands that are occupied by the auxiliary computing device 15 (e.g., one or two hands). At 320, the processor 30 may evaluate at least data from the plurality of inertial sensors, the passive optical sensor, the optical depth sensor, and the touch panel to detect a movement of the computing device and a movement of the user's hands. For example, the processor may analyze the received data in relation to a proximity threshold to determine what is the current movement of the device 15 (e.g., is the device being held, is the device positioned on a surface, etc.) and the hands of the user (e.g., one hand is holding the device 15, the other hand is pointing towards a 3D object, both hands are holding, the device 15, etc.).

At 330, the processor 30 may evaluate at least data from the optical depth sensor, the touch panel, and the plurality of inertial sensors to extract a plurality of features including at least user focus analysis data and user hands position. In one example, the user focus analysis data may be the data identified at block 240 of the method 200 (i.e., whether the user is focusing on the computing device 15 and whether the touch panel is engaged). Further, the user hand position may identify a specific hand position by the user (e.g., fist, pointing, "ok" sign, flat hand, etc.) based on the data from the optical depth sensor and the touch panel 58.

Next, at 340, the processor may classifying the pose of the user in relation to the computing device based on the number of free hands of the user (or the number of free hands), the movement of the computing device, the movement of the user's hands, the user's focus analysis data, and the user's hands position. For example, the processor uses the available data to identify how the user is holding the device 15 (e.g., holds by two hands, holds by one on the edge, holds by one hand on the bottom, does not hold the device and both hands are free, etc.).

With continued reference to FIG. 2, the processor may determine an intention of the user in relation to the 3D virtual objects based on the user's attention engagement level and the user's pose (at 130). In one example, based on the user's behavior (i.e., level of engagement with system 5 and the pose in relation to the device 15), the processor 30 may determine what are the intentions of the user in relation to the 3D objects (e.g., the user intends to select an object, view an object, etc.).

Next, at 140, the processor may automatically transition the system to an interaction mode based on the identified user intention. In one example, the processor may automatically adjust the system 5 to a specific interaction mode based on the user intention. That way, the system 5 may quickly adapt to the predicted behavior of the user, which makes the system self-intuitive and much more appealing to users.

The system 5 may implement various interaction modes related to the 3D objects displayed by the system: navigation, selection, pointing, filtering, zooming, storing, quantitative measurement, querying, historical path, annotations, etc. The following list of interaction modes only represents an example of different modes and is not to be viewed as a complete list of all interaction modes that can be implemented by the system.

In one example, the processor 30 may transition the system to one of the following interaction modes: a) a selection mode to select at least one 3D visualization by using the computing device 15; b) a navigation mode to navigate the at least one 3D visualization by using the computing device 15; c) a slice and detail mode to create a virtual slicing plane of the at least one 3D visualization to generate a sliced visualization; d) a store and retrieve mode to store at least one 3D visualization on the computing device 15 and to retrieve at least one 3D visualization from the computing device 15 for displaying it on the 3D display 10; e) a measurement mode to measure elements of at least one 3D visualization or distances between a plurality of 3D visualizations.

After the processor 30 transitions the system 5 to an interaction mode based on the identified user intention, the processor may execute an action with at least one 3D virtual object based on an identified user gesture and a selected interaction mode. In one example, the processor 30 may recognize user inputs provided through different gestures, and may perform a specific action with a 3D object (e.g., slicing a section of the 3D object, pointing to an object, etc.) based on the gesture and the previously selected interaction mode.

Figure 5:
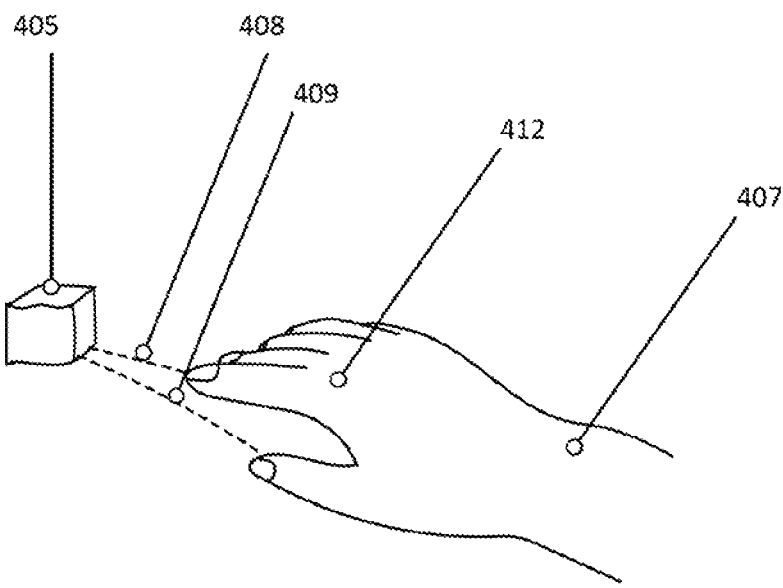
FIG. 5 illustrates an example of an action to select a single 3D visualization in accordance with an example implementation of the present disclosure.

FIG. 5 illustrates an example of an action to sated a single 3D visualization 405 in the system 5. In one example, FIG. 5 illustrates a 3D visualization 405 displayed on a 3D display (not shown) and a user's hand 407. When the system 5 is in a selection interaction mode (which is previously selected by the processor 30), the visualization action engine 42 is to: detect a pointing gesture 412 by the user's hand 407, detect a first line 408 between an index finger and the 3D visualization 405, detect a second line 409 between a thumb and the 3D visualization 405, calculate an angle between the first line 408 and the second line 409, and select the 3D visualization 405. In some examples, the angle between lines 408 and 409 may be a divergent angle, a zero angle, or a convergent angle.

A divergent angle and a zero angle between lines 408 and 409 may mean that the line 409 from the thumb and the line 408 from the index finger may never cross, and, therefore, the user may have no intention to select the 3D object 405. In that case, the processor 30 may not select the 3D object 405. If the angle between lines 408 and 409 is a convergent angle, that may mean that there is a crossing point (assuming they are in the same plane) between the two lines. In that case, the processor 30 may select the 3D object 405 for further actions. This natural gesture in combination with the selected interaction mode gradually narrows the gap between the tip of the thumb and the tip of the index finger, which increases the convergent angle and shortens the depth of the selection point.

Figure 6:
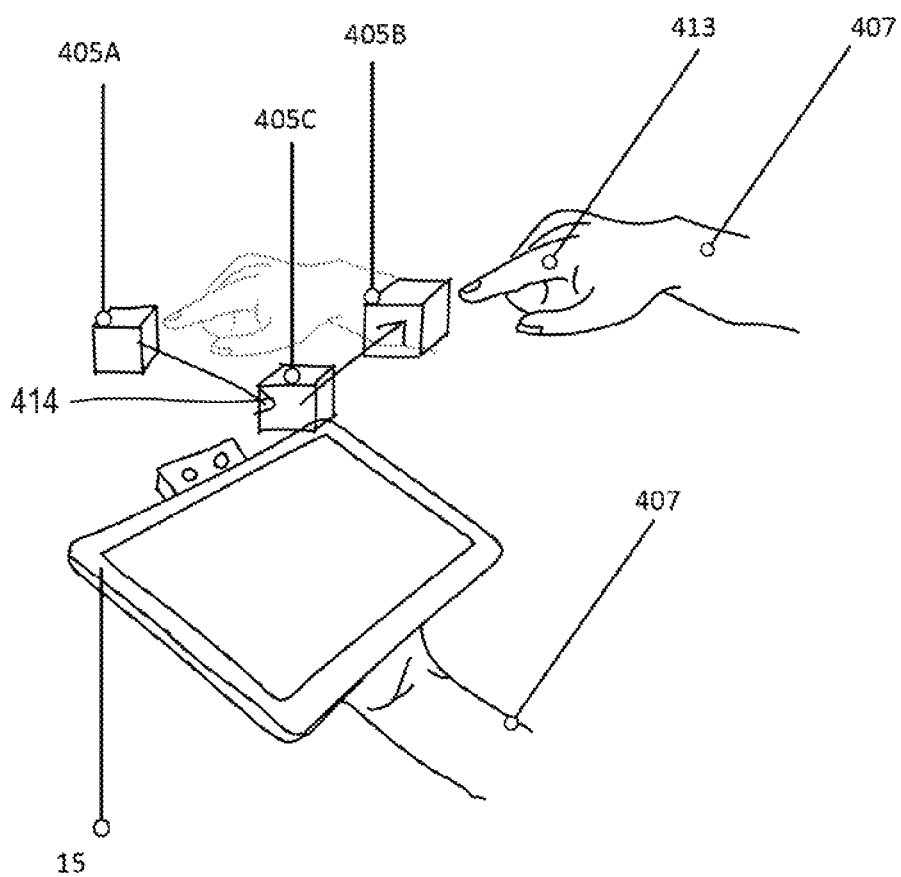
FIG. 6 illustrates an example, of an action to select multiple 3D visualizations in accordance with an example implementation of the present disclosure.

FIG. 6 illustrates an example of an action to select multiple 3D visualizations 405A-C displayed on a 3D display (not shown). When the system 5 is in a selection interaction mode (which is previously selected by the processor 30), the visualization action engine 42 is to: detect a pointing gesture 413 by the user's hand 407, detect a move 414 (e.g., lasso move, etc.) of a finger in a space, the move connecting the multiple 3D visualizations 405A-C, and select the multiple 3D visualizations 405A-C. Thus, because the user is focusing on the 3D display 10 and the system 5 is already in selection interaction mode, the processor 30 "expects" a selection action from the user and can easily identify the multiple objects selection action by the user.

Figure 7:
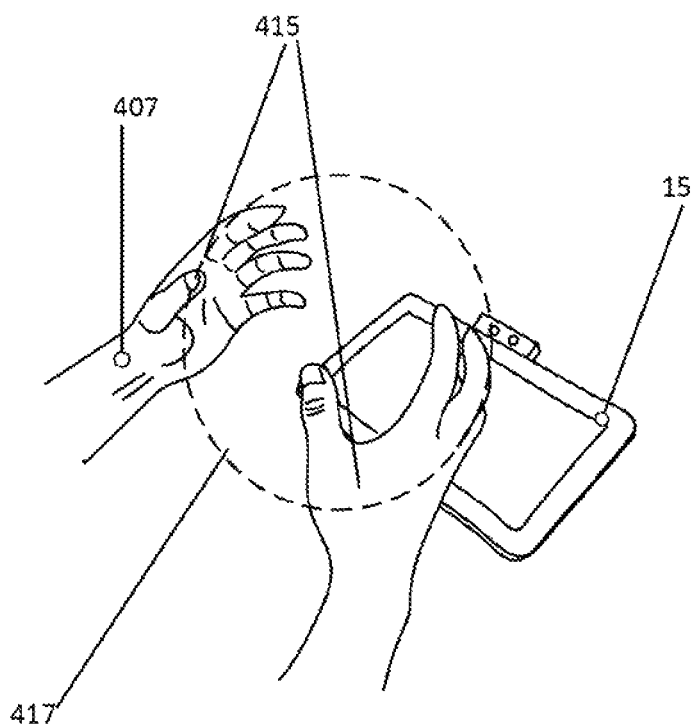
FIGS. 7 and 8 illustrate an example of an action to select a range of 3D visualizations in accordance with an example implementation of the present disclosure.
Figure 8:
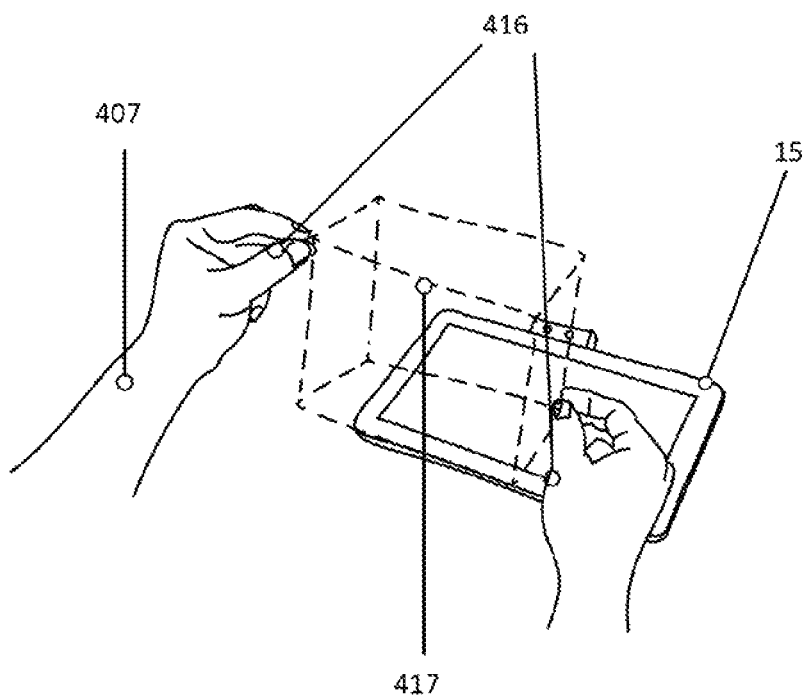

FIGS. 7 and 8 illustrate an example of an action to select a range of 3D visualizations. In the illustrated examples, the computing device 15 may be placed on a surface (not shown) such that both hands 407 of the user are free. The user can see the 3D visualizations (not shown) on the 3D display 10 (not shown). When the system 5 is in a selection interaction mode (which is previously selected by the processor 30), the visualization action engine 42 is to: detect a defining gesture 415/416 (respectively shown in FIGS. 7 and 8) by the user's hands 407 to define or create a 3D virtual object 417 (e.g., sphere, bounding box, etc.), and select a range of 3D visualizations or an area of one 3D object within the virtual object 417.

In one example, the virtual object 417 reflects the distance between the user's hands 407. The distance between the user's hands may correspond to the area or range of the 3D visualizations being selected. Therefore, because the user is focusing on the 3D display 10 and the system 5 is already in selection interaction mode, the processor 30 "expects" a selection action from the user and can easily identify the filtering action by the user.

Figure 9:
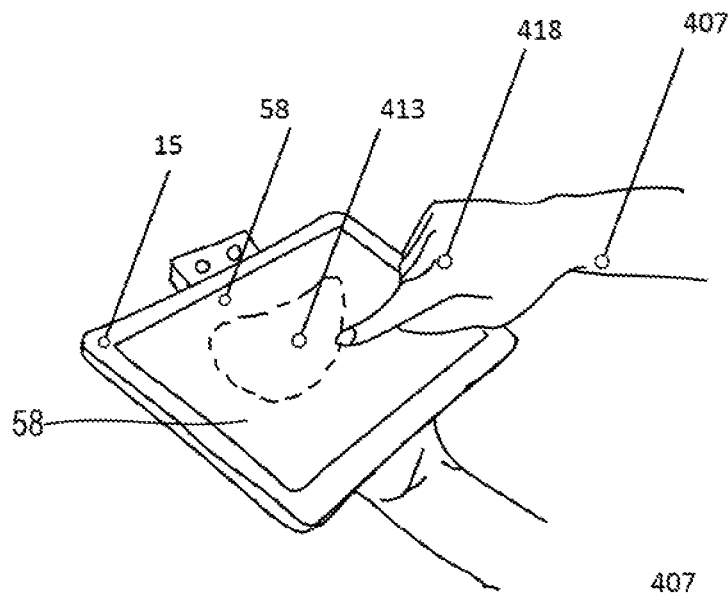
FIGS. 9 and 10 illustrate an example of an action to create a profile of a 3D visualization and define a volume of the 3D visualization in accordance with an example implementation of the present disclosure.
Figure 10:
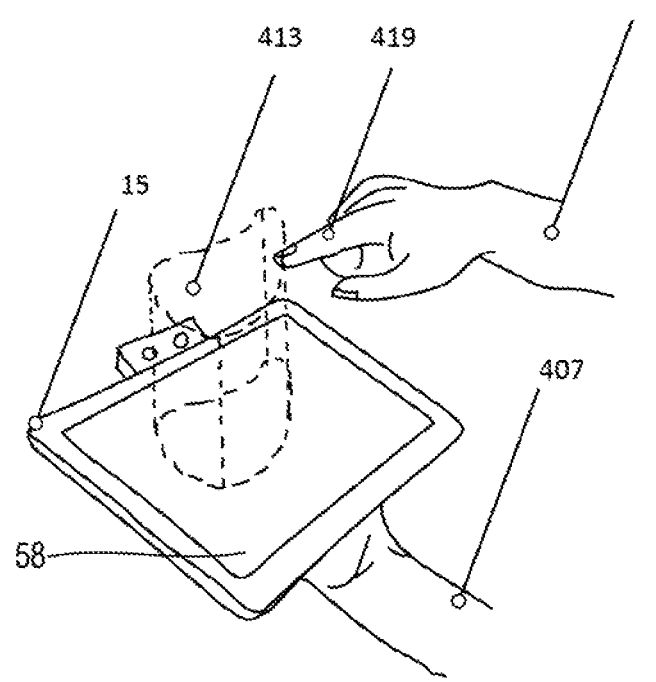

FIGS. 9 and 10 illustrate an example of an action to create a profile of a 3D visualization and define a volume of the 3D visualization. In one example, the visualization action engine 42 may create a profile of a 3D visualization on the multi-touch display based on at least one gesture by the user. When the system 5 is in a selection interaction mode (which is previously selected by the processor 30), the visualization action engine 42 is to: detect a drawing gesture 418 by the user's hand 407 on the multi-touch display 58 of the device 15 to create the profile 413 of the 3D visualization (see FIG. 9), detect an upward vertical moving gesture 419 by the user's hand 407 (see FIG. 10), and extend the profile 413 of the 3D visualization in the 3D space to define a volume of the 3D visualization. Therefore, when a user is focusing on the computing device 15 (i.e., holding it with one hand and has one available hand) and the system 5 is already in selection interaction mode, a user is able to draw a profile 413 and use an upward gesture to define the 3D range or volume of the profile.

Figure 11:
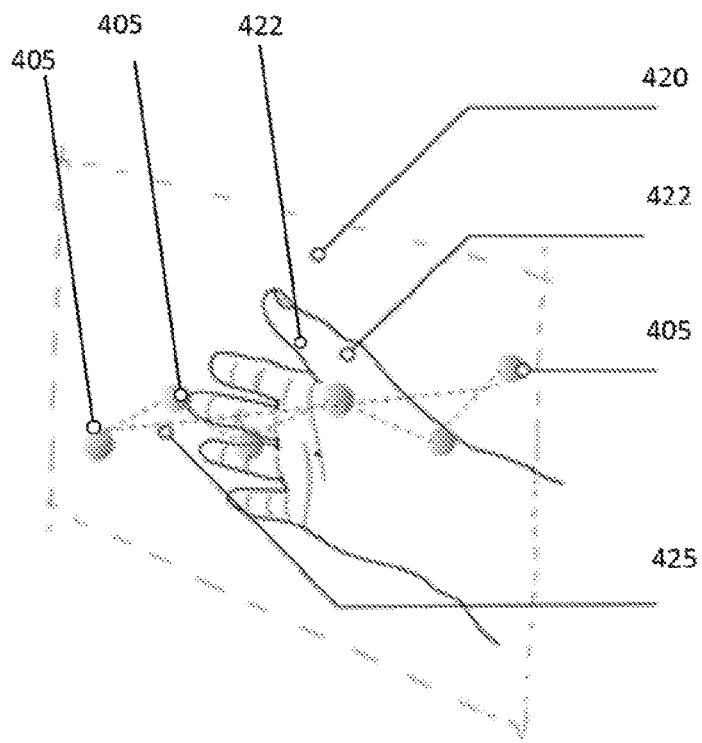
FIG. 11 illustrates an example of an action to measure characteristics related to 3D visualizations in accordance with an example implementation of the present disclosure.

FIG. 11 illustrates an example of an action to measure characteristics related to 3D visualizations 405. In some implementations, the system may measure elements of the 3D visualizations or distances between a plurality of 3D visualizations. In one example, when the system 5 is in a measurement interaction mode (which is previously selected by the processor 30), the visualization action engine 42 is to detect a first gesture (not shown) to select the 3D visualizations 405. This may be one gesture (e.g., pointing to multiple 3D objects with different fingers of the users hand) or a plurality of consecutive gestures (e.g., selectively pointing to multiple 3D objects with the index finger) by the user's hand 407. The visualization action engine 42 is further to detect a second gesture 422 to create a reference plane 420 for comparing the 3D visualizations in the virtual space after selecting the set of 3D objects, and to calculate measurement values for the 3D visualizations. In one implementation, the measurement values for the 3D visualizations may be calculated based on distances 425 between the 3D object, the form of the objects, etc.

In one example, the user may apply gestures to measure characteristics related to the total volume of the 3D objects 405, to the distance between the 3D objects 405, to the angles between the 3D objects, or to measure any other characteristics related to 3D visualizations 405. Therefore, the proposed system 5 allows for measurement of 3D visualizations directly in the three-dimensional space. The system determines the location of the 3D objects, switches to the measurement interaction mode based on the user's behavior, detects the gestures of the user in relation to the desired measurements, and successfully measures the desired characteristics of the 3D objects. After initial measurements, the user may use additional gestures to mark the virtual position of the 3D objects for further comparison and measurements.

Figure 12:
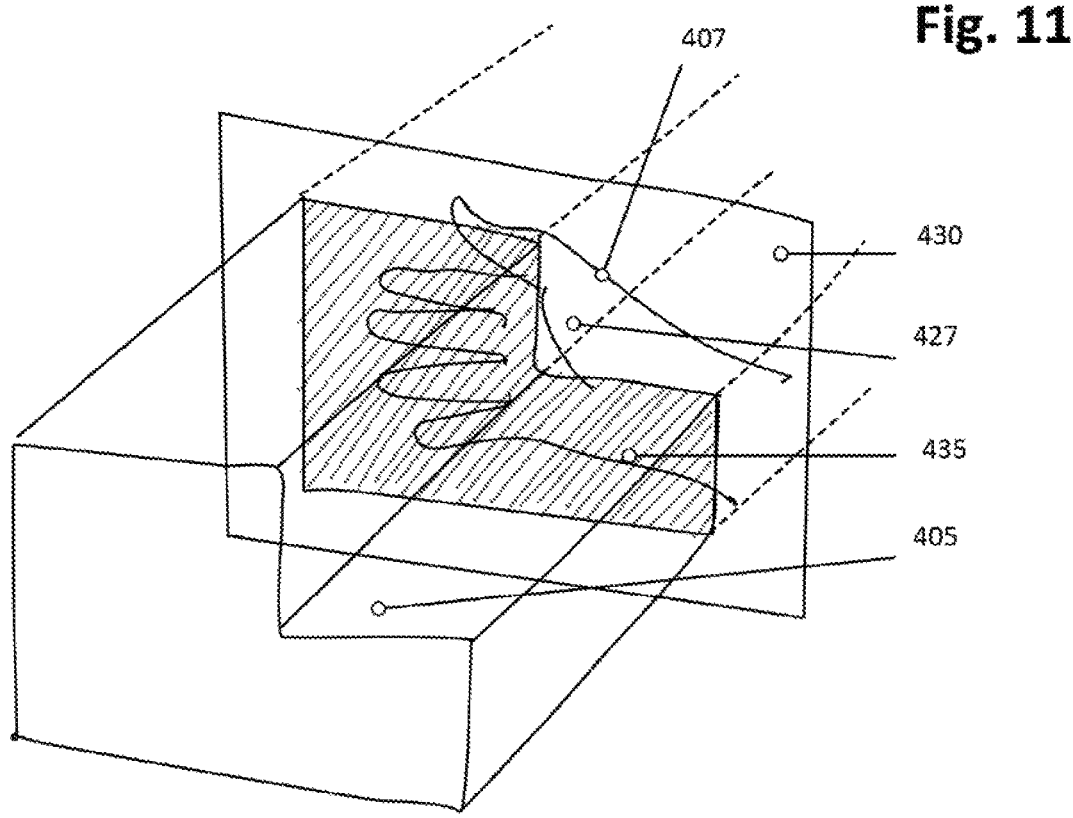
FIG. 12 illustrates an example of an action to slice a 3D visualization in accordance with an example implementation of the present disclosure.

FIG. 12 illustrates an example an action to slice a 3D visualization 405 in accordance with an example implementation of the present disclosure. In one example, when the system 5 is in a slice and detail interaction mode (which is previously selected by the processor 30), the visualization action engine 42 is to detect a gesture 427 to slice the 3D visualization 405. This may be one slicing gesture or a plurality of consecutive slicing gestures by the user's hand 407. The visualization action engine 42 is further to create a virtual slicing plane 430 of the at least one 3D visualization to create a sliced visualization 435.

For example, the processor 30 may use an algorithm to find the skeleton of the selected 3D visualization and, consequently, the user may slice the section along the axis of the 3D visualization for obtaining details (e.g., specific data when the 3D visualization represents data). In other example, the user may be focusing on the 3D display 15 and may have two hands available. In that situation, the user can use two hand gestures to define a custom axis. In addition, the user can use two hand gestures to define the range for slicing the 3D object, such as the gestures in FIGS. 7 and 8.

Figure 13:
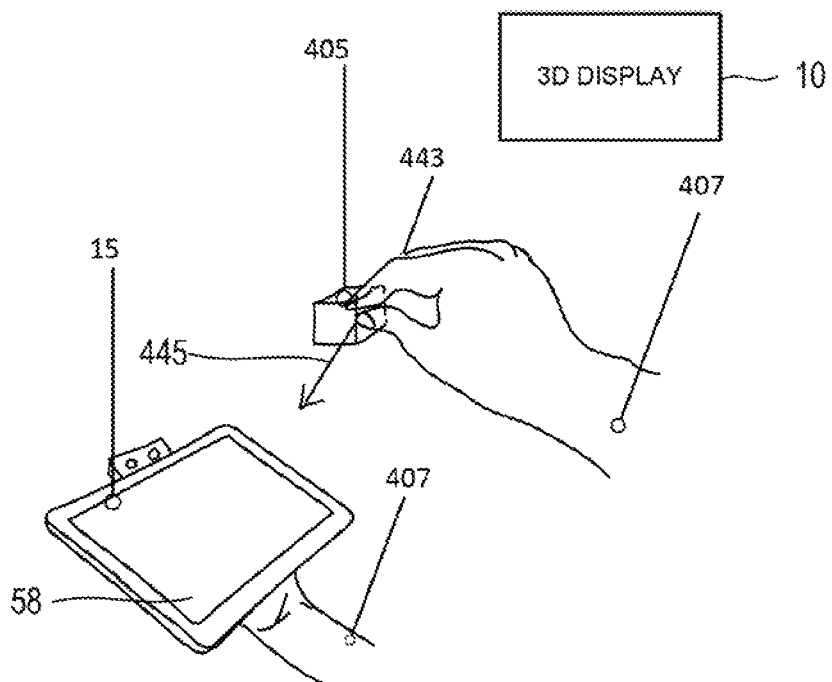
FIGS. 13 and 14 respectively illustrate examples of an action to store a 3D visualization and an action to retrieve a 3D visualization accordance with an example implementation of the present disclosure.
Figure 14:
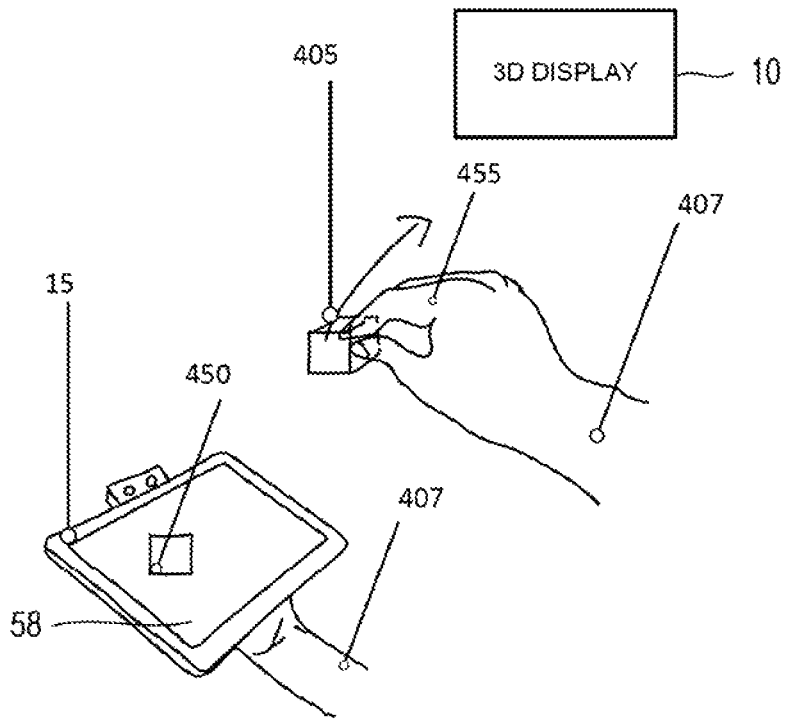

FIGS. 13 and 14 respectively illustrate examples of an action to store a 3D visualization and an action to retrieve a 3D visualization. FIGS. 13 and 14 show a 3D visualization 405, user's hands 407, a 3D display 10, and a computing device 15. Referring to FIG. 13, in one example, when the system 5 is in a store and retrieve mode (which is previously selected by the processor 30), the visualization action engine 42 is to: detect a first gesture 443 to select the 3D visualization 405 in the 3D space, and detect a second gesture 445 to move the 3D visualization to the multi-touch display 58. The visualization action engine 42 is further to save the 3D visualization 405 to the device 15 in order to store the 3D visualization 405. The stored 3D visualization 405 may be easily accessed and or transferred by the user.

Referring to FIG. 14, in another example, when the system 5 is in a store and retrieve mode (which is previously selected by the processor 30), the visualization action engine 42 is to: detect a first gesture (not shown) to select a profile 450 of the 3D visualization on the display 58 of the axillary computing device 15, detect a second gesture 455 to move the 3D visualization from the axillary device 15, and transfer the 3D visualization into 3D space.

Figure 15:
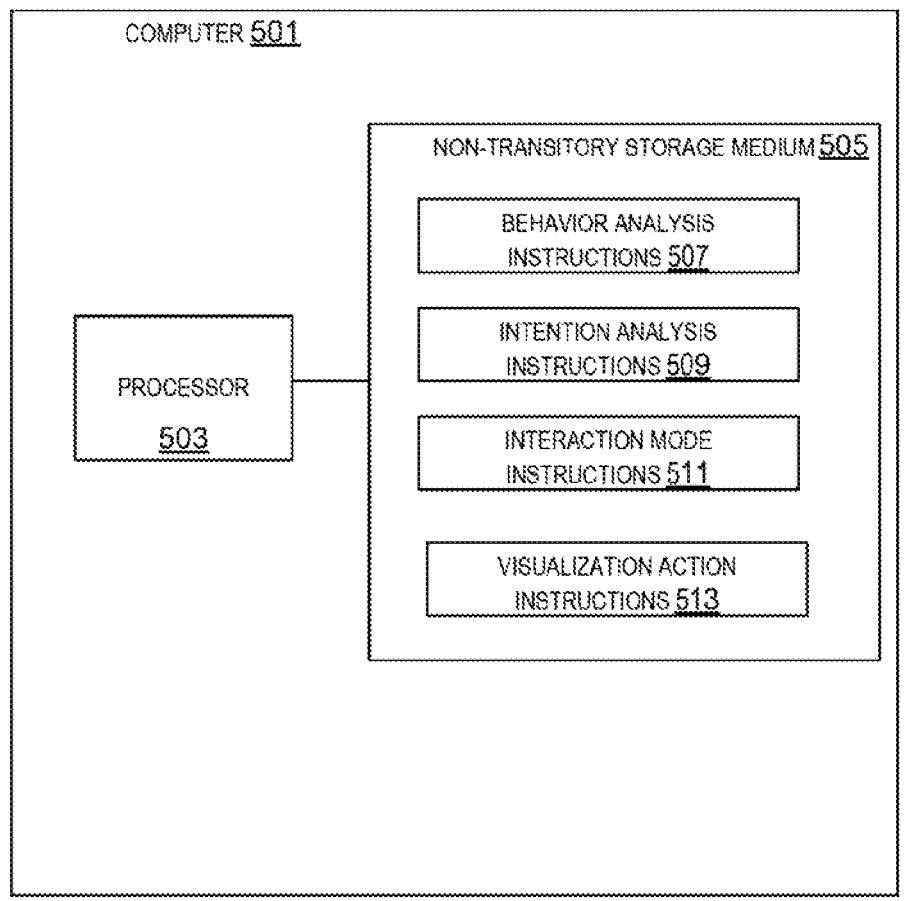
FIG. 15 is an example block diagram illustrating a computer-readable medium in accordance with an implementation of the present disclosure.

FIG. 15 illustrates a computer 501 and a non-transitory machine-readable medium 505 according to an example. In one example, the computer 501 maybe similar to the computing device 15 of the system 5 or may include a plurality of computers. For example, the computers may be server computers, workstation computers, desktop computers, laptops, mobile devices, or the like, and may be part of a distributed system. The computers may include one or more controllers and one or more machine-readable storage media. In one example, the computer may include a user interface (e.g., touch interface, mouse, keyboard, gesture input device, etc.).

Computer 501 may perform methods 100, 200, 300 and variations thereof. Additionally, the functionality implemented by computer 501 may be part of a larger software platform, system, application, or the like. Computer 501 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 501 may include a processor 503 and non-transitory machine-readable storage medium 505. The processor 503 may be, similar to the processor 30 of the computing device 15 and non-transitory machine-readable storage media 505 may be similar to the machine-readable storage media 37 of the device 15. Software stored on the non-transitory machine-readable storage media 505 and executed by the processor 503 includes, for example, firmware, applications, program data, filters, rules, program modules, and other executable instructions. The processor 503 retrieves from the machine-readable storage media 505 and executes, among other things, instructions related to the control processes and methods described herein.

The processor 503 may fetch, decode, and execute instructions 507-513 among others, to implement various processing. As an alternative or in addition to retrieving and executing instructions, processor 503 may include at least one integrated circuit (IC), other control logic, other electronic circuits, or combinations thereof that include a number of electronic components for performing the functionality of instructions 507-513. Accordingly, processor 503 may be implemented across multiple processing units and instructions 507-513 may be implemented by different processing units in different areas of computer 501.

The instructions 507-513 when executed by processor 503 (e.g., via one processing element or multiple processing elements of the processor) can cause processor 503 to perform processes, for example, methods 100-300, and/or variations and portions thereof, in other examples, the execution of these and other methods may be distributed between the processor 503 and other processors in communication with the processors 503.

For example, behavior analysis instructions 507 may cause processor 503 to perform behavior analysis of a user of a system displaying 3D object similar to the system 5. These instructions may function similarly to the techniques described in blocks 110 and 120 of method 100, and in more detail in the methods 200 and 300. For example, behavior analysis instructions 507 may cause processor 503 to determine an attention engagement level of the user, and to determine a pose of the user in relation to the computer 501.

Intention analysis instructions 509 may cause the processor 503 to perform an intention analysis of the user in relation to the 3D visualization based on the user's attention engagement level and the user's pose. These instructions may function similarly to the techniques described block 130 of method 100. For example, based on the identified user's behavior (i.e., the level of engagement with system 5 and the pose in relation to a computing device), the intention analysis instructions 509 may cause the processor 503 to determine what are the intentions of the user in relation to the 3D objects (e.g., the user intends to select an object, view an object, etc.).

Interaction mode instructions 511 may cause the processor 503 to automatically adjust the system to an interaction mode based on the identified user intention. These instructions may function similarly to the techniques described block 140 of method 100 and the method 300. For example, the interaction mode instructions 511 may cause the processor 503 to transition the system to an interaction mode based on the identified user intention. In one example, the processor may automatically adjust the system to a specific interaction mode based on the user's intention.

Visualization action instructions 513 may cause the processor 503 to implement an action with the 3D visualization based on a selected interaction mode and a detected user gesture. In one example, the visualization action instructions 513 may cause the processor 503 to recognize user inputs provided through different gestures, and to execute an action with a 3D object (e.g., selecting the 3D object, measuring characteristics related to the 3D object, etc.) based on the gesture and the previously selected interaction mode.

In the foregoing description, numerous details are set forth to provide an understanding of the subject matter disclosed herein. However, implementations may be practiced without some or all of these details, Other implementations may include modifications and variations from the details discussed above. It is intended that the appended claims cover such modifications and variations.

What is claimed is:

1. A system comprising:
a 3D display displaying a three-dimensional (3D) visualization;
an auxiliary computing device including:
a multi-touch display;
a plurality of sensors including an optical depth sensor, a passive optical sensor, and a plurality of inertial sensors; and
a processor to perform a behavior analysis of a user by using data from the plurality of sensors, wherein the processor is to:
determine a number that is indicative of an attention engagement level of the user, and determine a pose of the user in relation to the auxiliary computing device;
execute a face analysis of the user by using at least one of the optical depth sensor and the passive optical sensor;
execute an eye gaze analysis of the user by using the passive optical sensor;
execute an engagement evaluation of the user by using the passive optical sensor to determine whether the user is focusing on the system; and
execute a focus analysis of the user by using the plurality of sensors to determine whether the user is focusing on the auxiliary computing device and whether the multi-touch display is engaged;
determine an intention of the user in relation to the 3D visualization based on the number and the pose of the user; and
automatically adjust the system to an interaction mode based on the determined intention of the user.

2. The system of claim 1, wherein the processor is further to:
implement an action with the 3D visualization based on the interaction mode and a detected user gesture.

3. The system of claim 2, wherein the interaction mode includes at least one of:
a selection mode to select the 3D visualization by using the computing device;
a navigation mode to navigate the at least one 3D visualization by using the computing device;
a slice and detail mode to create a virtual slicing plane of the at least one 3D visualization to generate a sliced visualization;
a store and retrieve mode to store at least one 3D visualization on the computing device and to retrieve at least one 3D visualization from the computing device for displaying it on the 3D display; and
a measurement mode to measure elements of at least one 3D visualization or distances between a plurality of 3D visualizations.

4. The system of claim 3, wherein the action is to:
select a single 3D visualization, when the system is in a selection mode and the visualization action engine is to: detect a pointing gesture, detect a first line between an index finger and the single 3D visualization, detect a second line between a thumb and the single 3D visualization, and calculate an angle between the first line and the second line.

5. The system of claim 3, wherein the action is to:
create a profile of the 3D visualization on the multi-touch display and define
a volume of the 3D visualization, when the system is in the selection mode and the visualization action engine is to: detect a drawing gesture on the multi-touch display to create the profile of the 3D visualization, detect an upward vertical moving gesture, extend the profile of the 3D visualization in a 3D space to define a volume of the 3D visualization.

6. The system of claim 3, wherein the action is to:
measure characteristics related to 3D visualizations, when the system is in the measurement mode and the visualization action engine is to: detect a gesture to select the 3D visualizations, detect a gesture to create a reference plane for comparing the 3D visualizations, calculate measurement values for the 3D visualizations.

7. The system of claim 3, wherein the action is to:
store the 3D visualization, when the system is in the store and retrieve mode and the visualization action engine is to: detect a first gesture to select the 3D visualization in 3D space, detect a second gesture to move the 3D visualization to the multi-touch display, save the 3D visualization to the axillary device; and
retrieve the 3D visualization, when the system is in the store and retrieve mode and the visualization action engine is to: detect a third gesture to select a profile of the 3D visualization on the axillary device, detect a fourth gesture to move the 3D visualization from the axillary device, transfer the 3D visualization into 3D space.

8. The system of claim 1, wherein the processor is further to:
identify a number of user hands occupied by the auxiliary computing device based on the plurality of inertial sensors;
detect a movement of the auxiliary computing device and a movement of the user's hands;
extract a plurality of features including at least the user's focus analysis data and the user's hands position based on the optical depth sensor, the multi-touch display, and the plurality of inertial sensors; and
classify the pose of the user in relation to the auxiliary computing device based on the occupied user hands, the movement of the auxiliary computing device, the movement of the user's hands, the user's focus analysis data, and the user's hands position.

9. The system of claim 1, further comprising a removable jacket attachable to the auxiliary computing device to include the optical depth sensor, and at least one of a prismatic film and polarizing film attached to a top surface of the multi-touch display.

10. A method comprising, by at least one processor:
determining a number that is indicative of an attention engagement level of a user of a system, wherein the system includes a 3D display 5 displaying a 3D virtual objects, a computing device having a touch panel, and a plurality of sensors connected to the computing device, wherein determining the number includes:
performing a face analysis of the user by using at least one of an optical depth sensor and a passive optical sensor of the plurality of sensors;
performing an eye gaze analysis of the user by using the passive optical sensor;
performing an engagement evaluation of the user by using the passive optical sensor to determine whether the user is focusing on the system; and
performing a focus analysis of the user by using a plurality of inertial sensors of the plurality of sensors, the passive optical sensor, and the optical depth sensor to determine whether the user is focusing on the auxiliary computing device and whether the touch panel is engaged;
determining a pose of the user in relation to the computing device;
determining an intention of the user in relation to the 3D virtual objects based on the number and the pose of the user; and
automatically transitioning the system to an interaction mode based on the determined intention of the user.

11. The method of claim 10, further comprising executing an action with the 3D virtual object based on an identified user gesture and the interaction mode.

12. The method of claim 10, wherein determining a pose of the user in relation to the computing device includes:
using the plurality of inertial sensors to identify a number of free hands of the user;

using the plurality of inertial sensors, the passive optical sensor, the optical depth sensor, and the touch panel to detect a movement of the computing device and a movement of the user's hands;

using the optical depth sensor, the touch panel, and the plurality of inertial sensors to extract a plurality of features including at least the user's focus analysis data and the user's hands position; and classifying the pose of the user in relation to the computing device based on the number of free hands of the user, the movement of the computing device, the movement of the user's hands, the user's focus analysis data, and the user's hands position.

13. A non-transitory machine-readable storage medium encoded with instructions executable by at least one processor, the machine-readable storage medium comprising instructions to:

perform a behavior analysis of a user of a system, wherein the system includes a 3D display displaying a 3D visualization, a computing device having a multi-touch display, and a plurality of sensors connected to the computing device by using data from the plurality of sensors, the behavior analysis to:

determine a number that is indicative of an attention engagement level of the user, wherein determining the number includes:

performing a face analysis of the user by using at least one of an optical depth sensor and a passive optical sensor of the plurality of sensors;

performing an eye gaze analysis of the user by using the passive optical sensor;

performing an engagement evaluation of the user by using the passive optical sensor to determine whether the user is focusing on the system; and performing a focus analysis of the user by using a plurality of inertial sensors of the plurality of sensors, the passive optical sensor, and the optical depth sensor to determine whether the user is focusing on the auxiliary computing device and whether the touch panel is engaged; and determine a pose of the user in relation to the computing device;

perform an intention analysis to determine an intention of the user in relation to the 3D visualization based on the number and the user's pose;

automatically adjust the system to an interaction mode based on the determined intention of the user; and implement an action with the 3D visualization based on the interaction mode and a detected user gesture.

* * * * *

UNITED STATES PATENT AND TRADEMARK OFFICE
CERTIFICATE OF CORRECTION

PATENT NO. : 10,275,113 B2  
APPLICATION NO. : 15/511747  
DATED : April 30, 2019  
INVENTOR(S) : Chih Pin Hsiao et al.

Page 1 of 1

It is certified that error appears in the above-identified patent and that said Letters Patent is hereby corrected as shown below:

In the Claims

In Column 14, Line 36, Claim 10, after "display" delete "5".

Signed and Sealed this  
Fifth Day of May, 2020

Andrei Iancu  
*Director of the United States Patent and Trademark Office*